United States Patent

Boehme

[15] 3,684,841

[45] Aug. 15, 1972

[54] MULTI-CHANNEL MAGNETIC TRANSDUCER STRUCTURE HAVING FULL WIDTH ERASE HEAD IN NON-MAGNETIC HOUSING

[72] Inventor: Robert M. Boehme, Bolton, Mass.

[73] Assignee: Honeywell Inc., Minneapolis, Minn.

[22] Filed: Dec. 30, 1969

[21] Appl. No.: 889,055

[52] U.S. Cl..........179/100.2 C, 29/603, 179/100.2 D

[51] Int. Cl...........G11b 5/28, G11b 5/26, G11b 5/42

[58] Field of Search................179/100.2 D, 100.2 C; 340/174.1 F; 346/74 MC

[56] References Cited

UNITED STATES PATENTS

| | | | |
|---|---|---|---|
| 2,532,100 | 11/1950 | Howell | 179/100.2 C |
| 2,653,189 | 9/1953 | Camras | 179/100.2 C |
| 2,754,569 | 7/1956 | Kornei | 179/100.2 C |
| 2,941,045 | 6/1960 | Connell | 340/174.1 F |
| 3,064,333 | 11/1962 | Kristiansen et al. | 179/100.2 C |
| 3,334,192 | 8/1967 | Camras | 179/100.2 C |
| 3,495,230 | 2/1970 | Best | 346/74 MC |

FOREIGN PATENTS OR APPLICATIONS

| | | | |
|---|---|---|---|
| 838,656 | 7/1949 | Germany | 179/100.2 D |

OTHER PUBLICATIONS

Multi-track Magnetic Head, Dortort et al., RCA Technical Notes, RCA TN No. 214, Jan. 1959.

*Primary Examiner*—Bernard Konick
*Assistant Examiner*—Robert S. Tupper
*Attorney*—Fred Jacob and Ronald T. Reiling

[57] ABSTRACT

A magnetic transducer structure having an erase core integrally fabricated therewith. The recording/reproducing structure can be provided in a single channel read/write head configuration or a multi-channel read after write head configuration. The erase core is embedded within the magnetic transducer structure and is cylindrical in shape, having an open center portion adapted to accommodate an erase winding and further including a transverse gap that forms a part of the working surface of the magnetic transducer structure. The mass of the erase core is small, eliminating or reducing problems of magnetic retentivity.

3 Claims, 4 Drawing Figures

INVENTOR
ROBERT M. BOEHME
BY Anthony J. Sarli, Jr.
ATTORNEY

MULTI-CHANNEL MAGNETIC TRANSDUCER STRUCTURE HAVING FULL WIDTH ERASE HEAD IN NON-MAGNETIC HOUSING

BACKGROUND OF THE INVENTION

The present invention pertains to a magnetic transducer structure and more particularly to such a structure which integrally includes an erase core.

In order to ensure the reliability of data transfer to a magnetic storage medium, a check is customarily made wherein the transferred data is compared to the original data. In the case of a high-speed magnetic tape drive or a drum, such a check is sometimes carried out by reading the transferred data immediately after it has been recorded and comparing it to the data originally transferred. To this end, a double head configuration may be employed wherein the read head, which has the same number of cores as the write head, is positioned in mirror-image relationship a fixed distance behind the latter in the direction of motion of the magnetic medium. In order to prevent crosstalk between cores of two heads which do not correspond to the same channel of the magnetic medium, the two heads are positioned so that the center lines of the corresponding cores, which coincide with the center lines of the respective channels of the magnetic medium, are aligned with each other. Such a double head configuration is used as the illustrative embodiment of the present invention.

In a multi-channel recording arrangement it is further important to provide shielding between the respective cores of each head in order to limit interchannel crosstalk with respect to a single head. Such crosstalk may occur due to flux fringing in the vicinity of the gaps which are aligned transverse to the direction of the motion of the medium in each multichannel head. It is additionally important to provide for shielding between the respective heads to prevent the transfer of data therebetween. Such data transfer, which is also due to flux fringing, may cause spurious data to be recorded.

One technique presently in use for fabricating the aforesaid double head configuration generally requires each head to be built up from a pair of head sections, each head section including a non-magnetic, metallic supporting structure having ribbed cavities stamped therein, the cavities accommodating identical core portions. The head sections are subsequently joined to form a complete multi-channel head which can be shielded from a second head to form the fundamental transducer structure.

In association with most magnetic recording-reproducing devices, it is common to providing an erase core for erasing portions of a recording medium or the entire recording medium. Usually, the magnetic transducer structure is fabricated as discussed above, separately from the erase head. It is quite common to have the erase head subsequently mounted to the fundamental transducer structure in a convenient location as close to the magnetic head structure as is practicable possible. Other transducer structures provide for independent and separate mounting of the erase head. However, there is usually a spatial limit to the proximity with which the erase head can be brought to the read/write head. Associated with this limitation are certain disadvantages, as are there with the use of a separate erase head. For example, the farther away the erase is from the read/write head, the greater the distance that the recording medium has to be read backwards in order to rerecord a record containing an error. Also, the placement of the erase head necessitates a longer interrecord gap when rewriting a previously recorded record. In addition to the aforementioned, one further problem associated with a separate erase head is the need for adjusting the erase head with reference to the read/write head so that proper erasure of a record takes place.

Another serious problem concerning erase heads used in conjunction with record/write heads is that of magnetic retentivity. Retentivity is a property of materials of a nature suitable for use in magnetic transducer cores which allows a certain amount of residual magnetism to remain after the driving current to the head is removed. The retentivity of a material is related to the mass thereof. In the case of an erase head, retentivity can cause partial erasure of information on the tape, reducing the playback amplitude of recorded information.

As a consequence, it is desirable to provide a magnetic transducer structure wherein the erase head is integrally fabricated with the read/write heads and is therefore in much closer proximity to the read/write heads.

It is an object of the present invention, therefore, to provide a read/write/erase structure that is fabricated as a single unit.

It is a further object of the invention to provide a magnetic read/write/erase structure that is simple in construction and effective in operation.

It is a further object of the present invention to eliminate the necessity for providing separate spatial adjustments of the erase and the read/write heads.

A still further object is to provide an erase head of relatively small mass to eliminate or reduce problems of magnetic retentivity.

SUMMARY OF THE INVENTION

The foregoing objects of the present invention are attained by providing a cylindrically shaped erase core that is integrally fabricated within the read/write recording structure. The cylindrically shaped erase core is in close proximity to the separate recording cores and overlaps the path created by the write cores on a storage medium. The erase core structure has a circular opening therethrough and a gap that also forms part of the working surface of the head structure. The gap is parallel to the gaps of the read/write heads and is adapted to erase the entire portion of the recording medium prior to its approach to the other core segments. The cylindrically shaped erasure core is relatively uncomplex in design and easily formed as part of the transducer structure.

Further, the cylindrical design of the erase core, with its attendant lack of a back gap and external corners, provides a low leakage flux path. The efficiency gained through low leakage is utilized in permitting lower driving power which, when applied through a relatively heavy conductor reduces greatly the possibility of burn-out of he erase core energization winding. Further, with the efficiency gained, the core need have a substantially smaller mass, thereby relieving in large degree the problems of retentivity.

Other objects and advantages of the invention become apparent from a consideration of the following detailed description and claims taken together with the accompanying drawings in which:

DETAILED DESCRIPTION OF A PREFERRED EMBODIMENT

Figure 1:
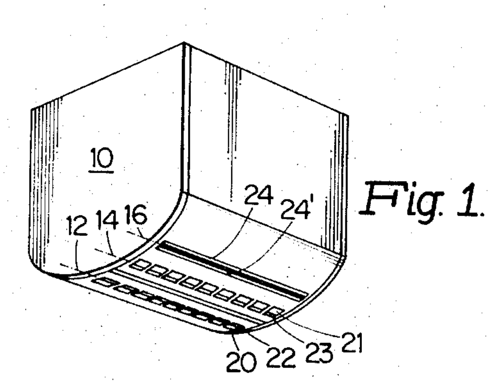
FIG. 1 is a perspective view of an illustrative embodiment of the magnetic transducer structure of the present invention.
Figure 2:
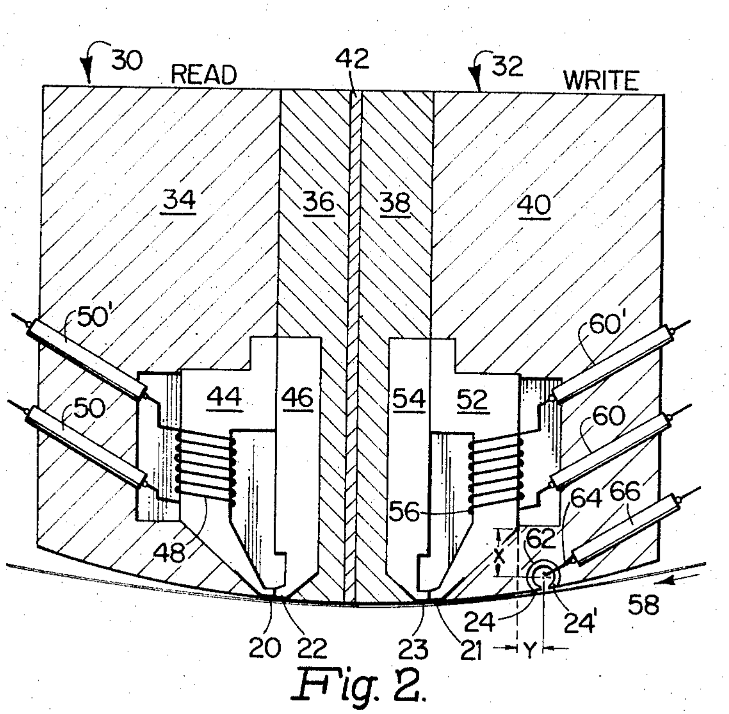
FIG. 2 is a cross-sectional view of the structure of FIG. 1.

In FIG. 1 there is illustrated a perspective view of magnetic transducer structure 10. FIG. 2 is a cross-section view of the magnetic transducer of the present invention, showing the internal structure in somewhat more detail than that disclosed in FIG. 1. In teaching the subject matter of the present invention, FIGS. 1 and 2 are generally discussed together.

The transducer illustrated herein is a read/write structure having a plurality of separate core segments each representing separate information channels. The magnetic transducer includes read head 30 and write head 32 shown in detail in FIG. 2. Read head 30 is further separated into read head sections 34 and 36 which are separately fabricated and then joined.

Write head 32 includes write head sections 38 and 40 which also are separately fabricated and then joined. Within write head 32 there is also shown an erase core 62 which is tubular in construction and has a circular cross section. A C-shaped core segment 52 of magnetic material is embedded in write section 40 while an I-shaped core segment 54 is embedded in write head section 38. The core segments 52 and 54 together with their respective pole faces 21 and 23, with a gap defined therebetween, make up the magnetic circuit used for writing data onto the magnetic medium 58. A winding 56 encircles core segment 52 and connects to leads 60, 60'. These leads then connect to external drive circuitry (not shown).

With one corner 57 of core segment 52 as a reference point, the central line of erase core 62 can be located by predetermined *x* and *y* coordinates as shown in FIG. 2. Erase core 62 also includes pole faces 24, 24' which form a part of the working surface of the magnetic transducer structure. Winding 64 is coupled through the center of erase core 62, to lead 66 which terminates at a voltage source (not shown). This arrangement is particularly useful with a d.c. erase system which requires excitation of the erase core separate from the excitation of the write core.

Figure 3:
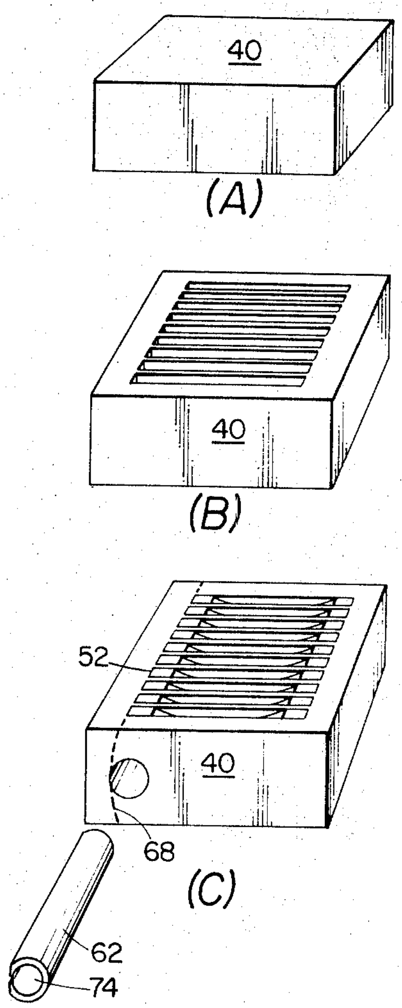
FIG. 3 shows three separate steps performed in the fabrication of a head section.

In FIG. 3 there are shown three steps in the fabrication of write head section 40. FIG. 3*a* shows the initial write head section 40 which is no more than a block of non-magnetic material that will be subsequently machined. In FIG. 3*b* the same block is shown having ribbed cavities stamped therein. FIG. 3*c* shows the core segments 52 inserted within these ribbed cavities in write head section 40. Again, using the corner of core segment 52 as a reference point the center line of a hole can be determined by a set of *x* and *y* coordinates. A hole is then machined in section 40 of a size sufficient to accommodate the erase core 62 which has been previously fabricated.

It should be noted that the basic fabrication of read head section 34 will be quite similar with the exception of the third step, absent in fabrication of read head section 34. Read head section 34 shown in FIG. 2 includes a C-shape core segment 44 having a pole face 20 that forms a part of the working surface of the magnetic transducer structure. Winding 48 encircles the core segment 44 and connects via leads 50, 50' to external sense circuitry (not shown).

In a similar manner read head section 36 has embedded therein an I-shaped core segment 46. During the fabrication of the read head 30 the read head sections 34 and 36 are brought together so that a magnetic path occurs via the core segments 44 and 46. The gap between these two core segments which occurs at the pole faces 20, 22, allows for the reading of recorded data from magnetic medium 58.

Referring again to FIG. 1, there is shown a read gap line 12, write gap line 14 and erase gap line 16. Each of the individual pole pieces 20, 22, and 21, 23 are also shown along with a single pole faces 24, 24' of the erase core. The gap lines 12, 14, and 16 are all parallel to each other in the illustrated embodiment and are in close proximity one to the other.

Figure 4:
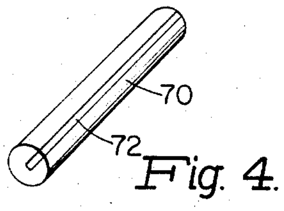
FIG. 4 is a perspective view of an erase core during one stage of manufacture according to the invention.

In fabricating erase core 62, a saw cut 72 (FIG. 4) is made nearly to the center of a rod 70 of a high purity material with good magnetic properties, such as Armco iron. The saw cut is then infiltrated with a non-magnetic brazing compound to completely fill the cut. The melting temperature of the brazing compound should be higher than the annealing temperature of the iron. The rod is then turned down to the desired outside diameter, in this case about 0.109 inch (7/64 inch).

The inside diameter 74 is then bored to a desired size (in this case about 0.078 inch) as shown in FIG. 3(*c*). The boring operation should leave a relatively thin-walled tube of about 0.021 inch, with its attendant low mass. The low mass allows for low retentivity or residual magnetism in the finished core. The core is then annealed to harden the iron.

The core 62 is inserted into the transducer structure 40 as described in FIG. 3(*c*) and the structure face ground or machined to reveal the gap 16 which is oriented toward the tape during insertion of the core into the transducer structure. During the transducer machining operation later described, approximately 0.002–0.005 inch may be machined off the erase core to decrease its cross section within the gap region thereby concentrating and intensifying the magnetic field in the gap region. This reduces the ampere turns required to provide effective erasing.

It should be noted that although a multi-track head is shown (FIG. 1), a single erase core is used, spanning the full width of the recording tracks and tape as shown at 24, 24' in FIG. 1.

With the erase core inserted into write head 32, write head 32 and read head 30 are joined together with a head separation shield 42 therebetween to prevent data transmission between the read and write portions of the assembled transducer.

The transducer is subsequently machined along its record-contacting face to expose the read, write and erase gaps. For example, in FIG. 3(*c*) the portion 40 of write head 32 is machined along a line approximately at 68 to expose the gaps between pole faces 24, 24' of the erase core 62 and pole face 21 of write head segment 52. This machining operation also serves, of course, to provide a very smooth record contacting surface on the working face of the transducer.

While the invention has been described with reference to a preferred embodiment, it will be apparent that numerous modifications, departures, substitutions and equivalents may now occur to those skilled in the art, all of which fall within the true scope and spirit of the invention and appended claims.

I claim:

1. A magnetic transducer head having erase, write and read cores therein and a non-magnetic housing, comprising:

a. stacked plates forming a plurality of first C-shaped core segments, b. stacked plates forming a plurality of second C-shaped core segments, c. stacked plates forming a plurality of pairs of I-shaped return core segments between said first and second C-shaped core segments, forming a plurality of side-by-side read and write cores having non-magnetic gaps, d. said write and read cores supported in said non-magnetic housing, e. an erase core comprising:

1. a single tubular member of magnetic material extending across all of said gaps,

2. said tubular member having a slit in the form of longitudinal gap aligned and integral with the surface of said transducer head, and

3. a winding extending through said tubular member, f. said erase core located in a hole in said non-magnetic housing in close proximity to said write gap.

2. A magnetic transducer as set forth in claim 1 wherein said erase core is located in a hole formed in proximity to said write head in said non-magnetic housing.

3. A magnetic transducer as set forth in claim 1 wherein said non-magnetic housing includes receptacles for receiving said read core, write core and said erase core, said read, write and erase cores having pole faces coextensive to and coincident with the surface of said magnetic head so as to concentrate and intensify the magnetic field provided by said cores in the region of said slit.

* * * * *